Patented July 17, 1951

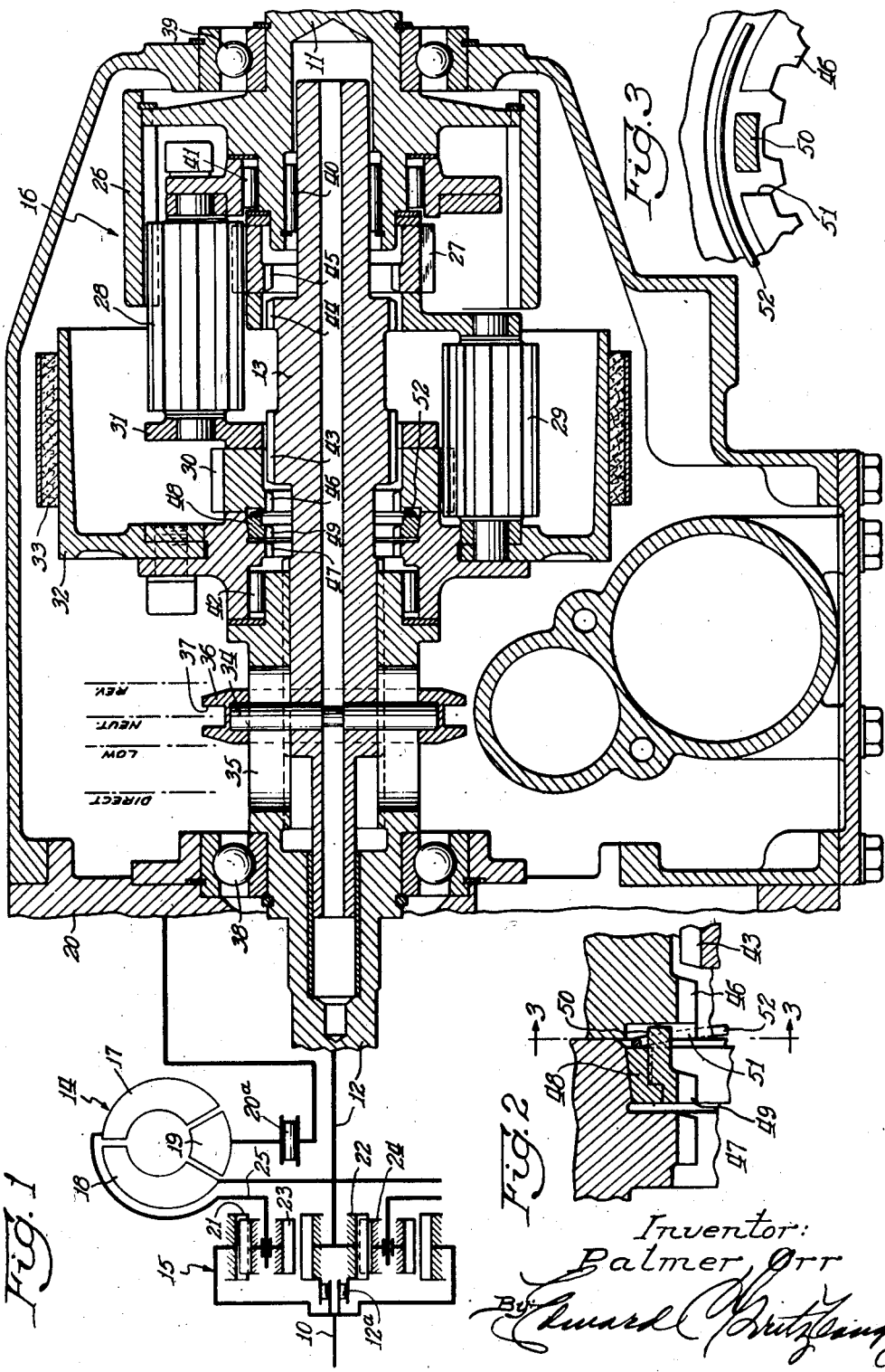

2,560,886

UNITED STATES PATENT OFFICE 2,560,886

TRANSMISSION

Palmer Orr, Muncie, Ind., assignor to Borg-Warner Corporation, Chicago, Ill., a corporation of Illinois Application December 22, 1947, Serial No. 793,097

7 Claims. (Cl. 74—789)

My invention relates to transmissions particularly suitable for use in automotive vehicles and more specifically to transmissions of this type comprising a hydrodynamic coupling.

It is an object of my invention to provide an improved transmission comprising a hydrodynamic coupling device which transmission includes gearing that will give a forward low speed ratio, a reverse drive and a direct drive between the hydrodynamic coupling device and an output shaft.

More particularly it is an object to provide such a transmission which includes a positive type clutch mechanism for conditioning the gear set connected in tandem with the hydrodynamic device for either of its three speed ratios, namely, low speed forward, reverse or direct drive, with a friction type brake being provided for starting drive of the output shaft and thereby of an automotive vehicle in which the transmission is installed from rest.

It is also an object to provide in such a transmission a synchronized clutch for shifting the gear set from its low speed forward drive to its direct drive ratio.

The invention consists of the novel constructions, arrangements and devices to be hereinafter described and claimed for carrying out the above stated objects and such other objects as will appear from a description of a preferred embodiment of the invention illustrated in the accompanying drawing, wherein:

Fig. 1 shows a longitudinal sectional view of a transmission embodying the principles of the invention with certain portions of the transmission being shown diagrammatically;

Fig. 2 is a fragmentary longitudinal sectional view on an enlarged scale of certain clutch structure illustrated in Fig. 1; and Fig. 3 is a sectional view taken on line 3—3 of Fig. 2 in the direction indicated.

Referring now to the drawing, the illustrated transmission comprises an input shaft 10, an output shaft 11, an intermediate shaft 12 and a second intermediate shaft 13. The shaft 12 is driven by means of a hydrodynamic torque converter 14 which in turn is driven by planetary speed-up gearing 15 connected with the input shaft 10. The intermediate shaft 13 is splined within the shaft 12 as shown and is constructed to connect with elements of a planetary type gear set 16 which is connected to drive the output shaft 11.

The torque converter 14 is of an ordinary type and comprises an impeller 17, a runner 18 and a stator 19. All three of the elements 17, 18 and 19 are within a common casing in which there is a quantity of fluid such as oil with the arrangement being such that when the impeller 17 is rotated, the runner 18 is driven at an increased torque and the stator 19 functions as the reaction member of the torque converter. The stator 19 is coupled with the casing 20 of the transmission by means of a one-way brake 20a which functions to allow a free rotation of the stator 19 in the forward direction, that is, in the same direction as the direction of rotation of the shaft 10 but prevents its rotation in the reverse direction. The runner 18 is connected with the shaft 12 as shown and this shaft functions as the driven shaft of the torque converter.

The planetary gear set 15 comprises a ring gear 21, a sun gear 22, a set of planet gears 23 (one being shown in the drawing) in mesh with the ring gear and a set of planet gears 24 (one being shown in the drawing) in mesh both with the sun gear and with the planet gears 23. The ring gear 21 is connected with the input shaft 10; the sun gear 22 is connected with the shaft 12 and the planet gears 23 and 24 are disposed on a planet gear carrier 25 which is connected with the impeller 17 of the hydrodynamic coupling device. A one-way roller clutch 12a is provided between the intermediate shaft 12 and the input shaft 10, and this clutch is so constructed as to engage when the drive is such that the intermediate shaft tends to drive the input shaft in the forward direction, or in the same direction as these two shafts are driven by the engine of the vehicle.

The planetary gear set 15 functions to drive the carrier 25 and thereby the impeller 17 at a speed greater than that of the input shaft 10 when the shaft 12 driven by the converter is stationary. As the runner 18 and the shaft 12 increase in speed of rotation, the speed of the carrier 25 and the impeller 17 decrease with respect to the speed of the shaft 10, and presently all of the parts of the planetary gear set 15 and the torque converter 14 rotate substantially at the same speed as the input shaft 10. The stator 19 is held stationary by the one-way brake 20a when torque is being multiplied through the converter 14 and the one-way brake allows the stator to rotate freely in the forward direction after the converter begins to function as a simple fluid coupling at which time there is no multiplication of torque. The one-way clutch 12a functions so that the shaft 12 may drive the shaft 10, as when the vehicle is coasting so that the drive need not go through the torque converter 14 with the attendant slip.

This particular arrangement of torque converter and planetary speed-up gearing is shown only diagrammatically in view of the fact that the construction is well-known in the prior art being shown, for example, in Schneider Patent No. 2,333,681.

The planetary gear set 16 comprises a ring gear 26 which is fixed to the output shaft 11, a sun gear 27, a set of elongated planet gears 28 in mesh with the sun and ring gears (one gear 28 being shown in the drawing), a set of elongated planet gears 29 each of which is in mesh with one of the gears 28 (only one of the gears 29 being shown in the drawing), a sun gear 30 in mesh with the gears 29 and a carrier 31 for the planet gears 28 and 29. A brake drum 32 is connected with the carrier 31, and a friction brake 33 actuated by any suitable mechanism is provided for braking the drum and thereby the gear carrier.

The intermediate shaft 13 is splined within the shaft 12 as shown and has fixed thereto a control rod 34 which extends through a suitable slot 35 within the shaft 12. The rod 34 carries a collar member 36 provided with a channel 37 therein for receiving a suitable fork (not shown) whereby the member 36, the rod 34 and thereby the shaft 13 may be shifted.

The shaft 12 is rotatably disposed within the transmission case by means of a ball bearing 38 and the output shaft is rotatably disposed within the case by means of a ball bearing 39. The shaft 13 is rotatably disposed within shaft 11 by means of a needle bearing 40; the carrier 31 is rotatably disposed on the shaft 11 by means of bearing 41; and the carrier is rotatably disposed with respect to the intermediate shaft 12 by means of bearing 42.

The intermediate shaft 13 is formed with external clutch teeth 43 and 44. The sun gear 27 is provided with internal clutch teeth 45 and the sun gear 30 is provided with internal clutch teeth 46. The carrier 31 is formed with internal clutch teeth 47, and a blocker type synchronizer ring 48 disposed within the carrier 31 as shown is provided with blocker teeth 49. As shown in Figs. 2 and 3, the ring 48 is provided with lugs 50 which extend into slots 51 in the gear 30. The slots allow the ring a limited rotation with respect to the gear, and at the limits of its movement, the blocking teeth 49 are out of line with the teeth 46 on the gear 30. a spring 52 is provided between the ring 48 and the gear 30 for holding the ring in engagement with the carrier 31.

The shaft 13 is movable longitudinally with respect to the transmission casing 20 and with respect to the shafts 12 and 11. The clutch teeth 44 by movement of the shaft 13 to the rear mesh with the teeth 45, and the teeth 44 and 45 thus constitute a positive clutch for connecting the shaft 13 with the sun gear 27. The teeth 43 on the shaft 13 are adapted to mesh with the teeth 46, and the teeth 43 and 46 thus constitute a positive type clutch for connecting the sun gear 30 with the shaft 13. The teeth 43, when the shaft 13 is moved farther forwardly, are adapted to mesh also with the teeth 47 on the carrier 31, while at the same time remaining in mesh with the teeth 46. In this case, the shaft 13 is connected both with the sun gear 30 as well as with the carrier 31. The synchronizer ring 48, when the teeth 43 abut against the teeth 49 thereon, functions to synchronize the carrier with the shaft 13 and when synchronism is attained, the blocker synchronizer 48 rotates slightly with respect to the teeth 43 and allows the latter teeth to come into engagement with the teeth 47.

In the operation of the illustrated transmission, which is assumed to be installed in an automotive vehicle as the transmission is particularly adapted for use in such a vehicle, the input shaft 10 is driven by means of the engine (not shown) of the vehicle, and the output shaft 11 is connected with the road wheels of the vehicle and drive the same through suitable connections (not shown). When the input shaft 10 is rotated, the impeller 17 of the torque converter 14 is driven at an increased speed with respect to the shaft 10 and applies torque on the runner 18 of the torque converter and thereby on the shaft 12. The shaft 13 together with its shift collar 36 are assumed to be in the positions in which they are shown, namely, in their neutral positions, with the teeth 43 and 44 being out of mesh with any of the other teeth in the transmission, and the friction brake 33 is released from the drum 32. The shaft 13 rotates freely within the gear set and there is no drive between the shaft 12 and the shaft 11.

The transmission is conditioned for low speed forward drive by engaging the teeth 43 with the teeth 46 by moving the shaft 13 forwardly of the transmission. The teeth 43 and 46 may be engaged with a minimum of clash due to the fact that the friction brake 33 is disengaged and it is necessary for the clutch teeth to pick up only the frictional and inertia loads of the parts in the gear set. With the teeth 43 and 46 engaged, the low speed forward drive train through the transmission may be completed gradually by a gradual engagement of the friction band 33. In this case the sun gear 30 is driven by means of the shafts 12 and 13 and the drive is through the planet gears 28 and 29 to the ring gear 26 and thereby to the output shaft 11. The planet gear carrier 31 is held stationary by means of the band 33, and the carrier 31 functions as the reaction member of the gear set.

In order to shift from low speed forward drive to high speed or direct drive in the gear set, the shaft 13 is shifted by means of its shift collar 36 forwardly to bring the teeth 43 into mesh also with the teeth 47 in addition to the teeth 46. With the teeth 43 being in mesh with both the teeth 46 and 47, the shaft 13 is coupled to both the carrier 31 as well as the sun gear 30. It will be understood that as this shift of the shaft 13 is made, the friction brake 33 is released. Coupling of both the sun gear 30 and carrier 31 to the shaft 13 causes a lock up of the parts of the gear set so that all of them rotate together and 1–1 drive results between the shafts 12 and 11. It will be understood that in both low speed forward drive and in direct drive through the gear set 16, the hydrodynamic coupling 17 transmits the torque as is required by the road wheels of the vehicle and the relation of the speeds between the impeller and drive shaft 10 varies in accordance with the load on the output shaft 11 in either of the speed ratios.

As has been described, the teeth 49 function to prevent a movement of the shaft 13 to bring its teeth 43 into engagement with the teeth 47 until there is a synchronization between the teeth 43 and 47. This synchronization is obtained by interrupting the drive between the shafts 10 and 11, as by decreasing the speed of the engine of the vehicle so as to allow synchronization in speed of the parts 13 and 31. The synchronizer ring 48 also functions to hasten this synchronizing so that the teeth 43 may move through the teeth 49 to engage with the teeth 47.

A drive in reverse may be obtained through the transmission by moving the shaft 13 rearwardly out of its neutral position in which it is shown to mesh the teeth 44 with the teeth 45. The engagement of these teeth is accomplished similarly to that of the teeth 43 and 46, namely, with the band 33 disengaged, and after the transmission has been conditioned for reverse by engagement of these teeth, the band 33 is engaged to complete the drive through the gear set and thereby through the transmission. The shaft 13 is driven from the shaft 12 and rotates the sun gear 27 in the forward direction. The band 33 functions to hold the carrier 31 stationary, and the ring gear 26 is thereby rotated in the reverse direction to give reverse drive through the transmission.

It will be apparent that the clutches comprising the teeth 44 and 45 and the teeth 43 and 46 function to condition the gear set for either a forward or reverse drive, and the actual starting of rotation and thereby starting of the vehicle is accomplished by engagement of the friction band 33 which may be made as gradual as desired. This feature advantageously allows a gradual starting of the vehicle even though positive type clutch teeth are utilized for conditioning the gear set for operation either for forward or reverse drive. A minimum of clashing of the teeth 44 and 45 and the teeth 43 and 46 is obtained when the gear set is conditioned for forward or reverse drive due to the fact that the friction brake is disengaged and thereby breaks any power train between the shafts 12 and 11. An upshift into direct drive from low speed forward drive is obtained simply by allowing synchronization of the parts 13 and 31 as has been described, with the shaft 13 being urged forwardly of the transmission, and this may be done simply by releasing the throttle of the engine for the vehicle for a moment so that the driving parts of the transmission decelerate. This thus is a so-called throttle or accelerator upshift.

I wish it to be understood that my invention is not to be limited to the specific constructions and arrangements shown and described except only insofar as the claims may be so limited, as it will be apparent to those skilled in the art that changes may be made without departing from the principles of the invention. In particular, I wish it to be understood that where in the following claims I have called for "engaging means" or the like, I mean such engaging means to not only include a clutch, but the purview of this expression also includes a brake.

I wish it to be understood also that the scope of my invention includes a construction in which the teeth 43 and 44 on the shaft 13 are integral and are simply extensions each of the other, unless the claims are definitely so limited.

I claim:

1. In a transmission, the combination of a drive shaft, a driven shaft, a gear set of the planetary type, means for completing a reverse drive, a low speed forward drive and a direct drive through said gear set and between said shafts and including three positive type clutches, said gear set comprising two sun gears and a planet gear carrier each carrying one of the meshable elements of the three positive clutches, and a shaft non-rotatable with respect to one of said shafts and slidable longitudinally with respect thereto, said slidable shaft having a clutch portion meshable with each of the clutch elements on said sun gears for providing said low forward and said reverse drives and meshable with one of these clutch elements and also with the clutch element on said carrier at the same time for providing said direct drive.

2. In a transmission, the combination of a drive shaft, a driven shaft, a planetary type gear set, said planetary gear set comprising a ring gear connected with one of said shafts, a sun gear, a planet gear in mesh with said sun and ring gears, a second planet gear in mesh with said first planet gear, a second sun gear in mesh with said last-mentioned planet gear, and a carrier for said planet gears, said two sun gears and said carrier each having clutch teeth, and a shaft splined with respect to the other of said shafts and having a clutch portion meshable with the teeth of said two sun gears for providing alternatively a low speed forward or reverse drive through said gear set and between said shafts and meshable with the teeth on said carrier at the same time as with the teeth on one of said sun gears for locking up said gear set and providing a direct drive between said shafts.

3. In a transmission, the combination of a drive shaft, a driven shaft, a planetary gear set comprising a sun gear element, a ring gear element and a planet carrier element and planet gears in mesh with the sun and ring gear elements, one of said elements being connected with said driven shaft, means for providing alternatively a change speed forward drive or a direct forward drive through said gear set and between said drive and driven shafts and including clutch means for connecting alternatively the other of said shafts with one of the other of said elements for providing said change speed drive or with both of the other of said elements for providing said direct drive, and a brake for said planet gear carrier element for providing a reaction for the gear set when said driven shaft is driven at said change speed drive.

4. In a transmission, the combination of a drive shaft, a driven shaft, a planet gear set, said planet gear set comprising a sun gear, a ring gear, a planet gear in mesh with said sun and ring gears, a second planet gear in mesh with said first planet gear, a sun gear in mesh with said second planet gear and a planet gear carrier, said ring gear being connected with one of said shafts, a shaft slidably splined with respect to the other of said shafts, said two sun gears and said carrier being formed with clutch teeth and said slidable shaft also being formed with clutch teeth, the teeth on said slidable shaft being adapted to mesh alternatively with said two sun gears for providing a low speed forward drive or a reverse drive through said gear set and between said drive and driven shafts and being meshable both with one of said sun gears and with said planet gear carrier to provide a direct drive between said shafts, a friction type brake for said carrier for providing a reaction point for the gear set in low forward or reverse drives, and a blocker type synchronizer for synchronizing the slidable shaft and said carrier and preventing engagement thereof prior to synchronization in shifting the gear set into direct drive condition.

5. In a transmission, the combination of a drive shaft, a driven shaft, a planetary gear set, said gear set comprising a sun gear element, a ring gear element, a planet gear in mesh with said sun and ring gear elements, a second planet gear in mesh with said first planet gear, a sun gear element in mesh with said second planet gear, and a carrier element for said planet gears, one of said elements being connected with said driven shaft, means for providing a low speed forward drive, a reverse drive or a direct forward drive and including clutching means for alternatively connecting the other of said shafts with two other of said elements for respectively completing the low speed forward and reverse drives or alternatively with one of the latter elements and the remaining of said elements for completing the direct drive, and a brake for said last-named element for providing a reaction for the gear set when said driven shaft is driven at said low speed forward drive or at said reverse drive.

6. In a transmission, the combination of a drive shaft, a driven shaft, a planetary gear set, said gear set comprising a sun gear, a ring gear, a planet gear in mesh with said sun and ring gears, a second planet gear in mesh with said first planet gear, a sun gear in mesh with said second planet gear, and a carrier for said planet gears, said ring gear being connected with one of said shafts, means for providing a low speed forward drive or a reverse drive or a direct forward drive and including clutch means for alternatively connecting the other of said shafts with either of said sun gears for respectively completing the low speed forward and reverse drives or with one of the latter sun gears and with the carrier at the same time for completing the direct drive, and a brake for said carrier for providing a reaction for the gear set when said driven shaft is driven at said low speed forward drive or at said reverse drive.

7. In a transmission, the combination of a drive shaft, a driven shaft, a planetary gear set, said gear set comprising a sun gear element, a ring gear element, a planet gear in mesh with said elements, a second planet gear in mesh with said first planet gear, a sun gear element in mesh with said second planet gear, and a carrier element for said planet gears, one of said elements being connected with one of said shafts, and clutch means for alternatively connecting either of two of the other elements with said other shaft or connecting one of the latter elements and the remaining one of said elements at the same time with said other shaft, synchronizing blocker means for the clutch means connecting said other shaft with said last-named element for synchronizing the speeds of the parts to be coupled and preventing engagement of the clutch means prior to such synchronization, and a brake for said last-named element.

PALMER ORR.

REFERENCES CITED

The following references are of record in the file of this patent:

UNITED STATES PATENTS

| Number | Name | Date |
|---|---|---|
| 990,386 | Pilkington | Apr. 25, 1911 |
| 1,863,110 | Salerni | June 14, 1932 |
| 2,174,672 | Soden-Fraunhofen | Oct. 3, 1939 |
| 2,220,174 | Ravigneaux | Nov. 5, 1940 |
| 2,292,633 | Griswold | Aug. 11, 1942 |

FOREIGN PATENTS

| Number | Country | Date |
|---|---|---|
| 347,788 | Great Britain | May 7, 1931 |